(12) United States Patent
Beveridge et al.

(10) Patent No.: US 12,436,794 B2
(45) Date of Patent: Oct. 7, 2025

(54) WORKLOAD PLACEMENT RESPONSIVE TO FAULT

(71) Applicant: VMware LLC, Palo Alto, CA (US)

(72) Inventors: Daniel Beveridge, Valrico, FL (US); Ramnatthan Alagappan, Champaign, IL (US)

(73) Assignee: VMware LLC, Palo Alto, CA (US)

( * ) Notice: Subject to any disclaimer, the term of this patent is extended or adjusted under 35 U.S.C. 154(b) by 450 days.

(21) Appl. No.: 18/100,812

(22) Filed: Jan. 24, 2023

(65) Prior Publication Data

US 2024/0248736 A1    Jul. 25, 2024

(51) Int. Cl.
*G06F 9/455* (2018.01)

(52) U.S. Cl.
CPC .. *G06F 9/45558* (2013.01); *G06F 2009/4557* (2013.01); *G06F 2009/45583* (2013.01); *G06F 2009/45595* (2013.01)

(58) Field of Classification Search
CPC ......... G06F 9/45558; G06F 2009/4557; G06F 2009/45583; G06F 2009/45595
See application file for complete search history.

(56) References Cited

U.S. PATENT DOCUMENTS

| | | | |
|---|---|---|---|
| 9,348,724 B2 | 5/2016 | Ota et al. |
| 9,996,440 B2 | 6/2018 | Ganesan et al. |
| 10,963,356 B2 | 3/2021 | Gill et al. |
| 11,150,950 B2 | 10/2021 | Kumar et al. |
| 11,269,518 B2 | 3/2022 | Singh et al. |

*Primary Examiner* — Gregory A Kessler
(74) *Attorney, Agent, or Firm* — Kim & Stewart LLP

(57) ABSTRACT

The present disclosure relates to workload placement responsive to fault. One embodiment includes instructions to remove a first host from a first cluster of a software-defined datacenter (SDDC) responsive to a determination of a fault in a hypervisor of the first host, place the first host into a second cluster of the SDDC, wherein the second cluster is designated to run stateless workloads, and add a second host to the first cluster.

20 Claims, 4 Drawing Sheets

WORKLOAD PLACEMENT RESPONSIVE TO FAULT

BACKGROUND

A data center is a facility that houses servers, data storage devices, and/or other associated components such as backup power supplies, redundant data communications connections, environmental controls such as air conditioning and/or fire suppression, and/or various security systems. A data center may be maintained by an information technology (IT) service provider. An enterprise may utilize data storage and/or data processing services from the provider in order to run applications that handle the enterprises' core business and operational data. The applications may be proprietary and used exclusively by the enterprise or made available through a network for anyone to access and use.

Virtual computing instances (VCIs), such as virtual machines and containers, have been introduced to lower data center capital investment in facilities and operational expenses and reduce energy consumption. A VCI is a software implementation of a computer that executes application software analogously to a physical computer. VCIs have the advantage of not being bound to physical resources, which allows VCIs to be moved around and scaled to meet changing demands of an enterprise without affecting the use of the enterprise's applications. In a software-defined data center, storage resources may be allocated to VCIs in various ways, such as through network attached storage (NAS), a storage area network (SAN) such as fiber channel and/or Internet small computer system interface (iSCSI), a virtual SAN, and/or raw device mappings, among others.

DETAILED DESCRIPTION

Figure 1:
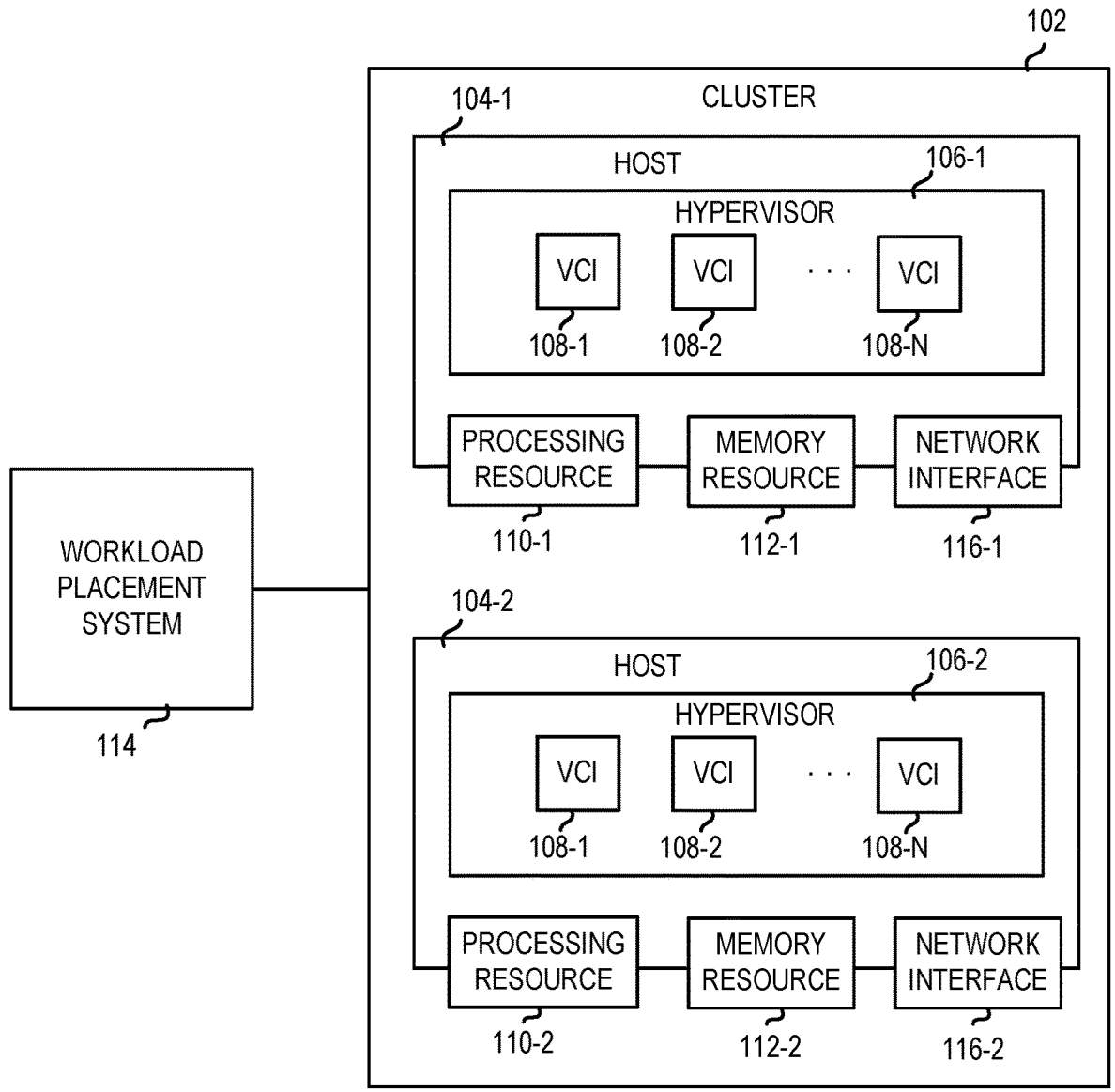
FIG. 1 is a diagram of a cluster and a system for workload placement responsive to fault according to one or more embodiments of the present disclosure.

The term "virtual computing instance" (VCI) refers generally to an isolated user space instance, which can be executed within a virtualized environment. Other technologies aside from hardware virtualization can provide isolated user space instances, also referred to as data compute nodes. Data compute nodes may include non-virtualized physical hosts, VCIs, containers that run on top of a host operating system without a hypervisor or separate operating system, and/or hypervisor kernel network interface modules, among others. Hypervisor kernel network interface modules are non-VCI data compute nodes that include a network stack with a hypervisor kernel network interface and receive/transmit threads.

VCIs, in some embodiments, operate with their own guest operating systems on a host using resources of the host virtualized by virtualization software (e.g., a hypervisor, virtual machine monitor, etc.). The tenant (i.e., the owner of the VCI) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VCI segregation that may be offered in hypervisor-virtualized environments that virtualize system hardware, and thus can be viewed as a form of virtualization that isolates different groups of applications that operate in different containers. Such containers may be more lightweight than VCIs.

While the specification refers generally to VCIs, the examples given could be any type of data compute node, including physical hosts, VCIs, non-VCI containers, and hypervisor kernel network interface modules. Embodiments of the present disclosure can include combinations of different types of data compute nodes.

As described further below, a host in an SDDC can include a hypervisor. A hypervisor can include a solid-state drive (SSD). As will be appreciated to those of skill in the art, SSDs can develop errors over time because of excessive writes to specific portions (e.g., cells, blocks, etc.) of the drive. This phenomenon may be termed data degradation, data decay, data rot, or bit rot, for example. In previous approaches, detection of such errors commonly results in the decommissioning and/or disposal of affected SSDs. Even in situations where an affected block can be identified and sequestered from future writes, previous approaches commonly err on the side of caution and decommission the device for fear that additional blocks may develop similar errors. Thus, an entire device, most of which is unaffected and suitably functional, is replaced. The costs involved in these approaches is undesirably high.

Embodiments of the present disclosure provide an alternative strategy for addressing the occurrence of defective portions of an SSD that allows for the extension of the lifespan of the device and its attended cost savings. For example, an SSD of a hypervisor of a host in a cluster can be determined to have undergone data degradation. Such a scenario may be referred to herein as a hypervisor having a fault and/or a hypervisor having reduced performance. In some embodiments, the corresponding host (sometimes referred to herein as an "affected host" or a "first host") can be removed from this production cluster (sometimes referred to herein as a "first cluster") and placed into a different cluster (sometimes referred to herein as a "remedial cluster" or a "second cluster"). A remedial cluster is a cluster of hosts having identified faults. In some embodiments, all the hosts of a remedial cluster are affected hosts. In some embodiments, less than all the hosts of a remedial cluster are affected hosts.

In accordance with embodiments herein, a remedial cluster can be created for the purpose of prolonging the useful life of SSDs while reducing (e.g., eliminating) the risk associated with keeping affected hosts in their normal production clusters. This risk is reduced by only allowing stateless workloads (e.g., Kubernetes workers) to be run on the remedial cluster. As known to those of skill in the art, stateless workloads can be easily re-instantiated on another host if the defective SSD were to cause an outage on the host such as a system halt due to input/output (I/O) errors, for instance.

As a result, the original cluster from which the host was removed is short one host and operating under a reduced capacity that might impact its ability to service its current workloads. In accordance with the present disclosure, a pool of floating unused hosts that are defect-free can be maintained at the ready. One of these hosts (sometimes referred to herein as a "replacement host" or a "second host") can be added to the cluster on demand to replace the affected and removed host.

In application architectures based on Kubernetes or similar modern application frameworks, there is often a clear delineation between servers that handle state such as databases or similar, and those stateless workers that are assigned a workload dynamically but operating as members of a cluster of such workers, wherein other members can easily take over for a member that experiences a fault. In accordance with embodiments of the present disclosure, the remedial cluster may only be used to host such stateless worker nodes so that a host failure will have negligible business impact. In some embodiments, all VCIs on a host in the remedial cluster are stateless and able to be replaced dynamically by the control framework, such as Kubernetes, for example, which is responsible for scheduling them and their workloads. Control plane servers would not be resident on the remedial cluster but may reside on another production cluster nearby.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Analogous elements within a Figure may be referenced with a hyphen and extra numeral or letter. Such analogous elements may be generally referenced without the hyphen and extra numeral or letter. For example, elements 108-1, 108-2, and 108-N in FIG. 1 may be collectively referenced as 108. As used herein, the designator "N", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a diagram of a cluster and a system for workload placement responsive to fault according to one or more embodiments of the present disclosure. The system can include a cluster 102 in communication with a workload placement system 114. The cluster 102 can include a first host 104-1 with processing resources 110-1 (e.g., a number of processors), memory resources 112-1, and/or a network interface 116-1. Similarly, the cluster 102 can include a second host 104-2 with processing resources 110-2, memory resources 112-2, and/or a network interface 116-2. Though two hosts are shown in FIG. 1 for purposes of illustration, embodiments of the present disclosure are not limited to a particular number of hosts. For purposes of clarity, the first host 104-1 and/or the second host 104-2 (and/or additional hosts not illustrated in FIG. 1) may be generally referred to as "host 104." Similarly, reference is made to "hypervisor 106," "VCI 108," "processing resources 110," memory resources 112," and "network interface 116," and such usage is not to be taken in a limiting sense.

The host 104 can be included in a software-defined data center. A software-defined data center can extend virtualization concepts such as abstraction, pooling, and automation to data center resources and services to provide information technology as a service (ITaaS). In a software-defined data center, infrastructure, such as networking, processing, and security, can be virtualized and delivered as a service. A software-defined data center can include software-defined networking and/or software-defined storage. In some embodiments, components of a software-defined data center can be provisioned, operated, and/or managed through an application programming interface (API).

The host 104-1 can incorporate a hypervisor 106-1 that can execute a number of VCIs 108-1, 108-2, . . . , 108-N (referred to generally herein as "VCIs 108"). Likewise, the host 104-2 can incorporate a hypervisor 106-2 that can execute a number of VCIs 108. The hypervisor 106-1 and the hypervisor 106-2 are referred to generally herein as a hypervisor 106. The VCIs 108 can be provisioned with processing resources 110 and/or memory resources 112 and can communicate via the network interface 116. The processing resources 110 and the memory resources 112 provisioned to the VCIs 108 can be local and/or remote to the host 104. For example, in a software-defined data center, the VCIs 108 can be provisioned with resources that are generally available to the software-defined data center and not tied to any particular hardware device. By way of example, the memory resources 112 can include volatile and/or non-volatile memory available to the VCIs 108. The VCIs 108 can be moved to different hosts (not specifically illustrated), such that a different hypervisor manages (e.g., executes) the VCIs 108. The host 104 can be in communication with the workload placement system 114. In some embodiments, the workload placement system 114 can be deployed on a server, such as a web server.

The workload placement system 114 can include computing resources (e.g., processing resources and/or memory resources in the form of hardware, circuitry, and/or logic, etc.) to perform various operations to place a workload responsive to fault, as described in more detail herein. Accordingly, in some embodiments, workload placement system 114 can be part of a cluster controller (e.g., a vSAN cluster manager). In embodiments in which the workload placement system 114 is part of a vSAN cluster controller, the local disks of the hosts 104-1 and 104-2 can act as pooled storage for the cluster 102 (e.g., a datastore) that can store data corresponding to the VCIs 108-1, . . . , 108-N.

In some embodiments, the host 104-1 and the host 104-2 each include a monitoring agent. The monitoring agent can determine a fault or a reduction in performance of an SSD as described herein. In some embodiments, the monitoring agent can trigger events in an event log responsive to determining a threshold-exceeding quantity of read errors associated with an SSD.

Figure 2A:
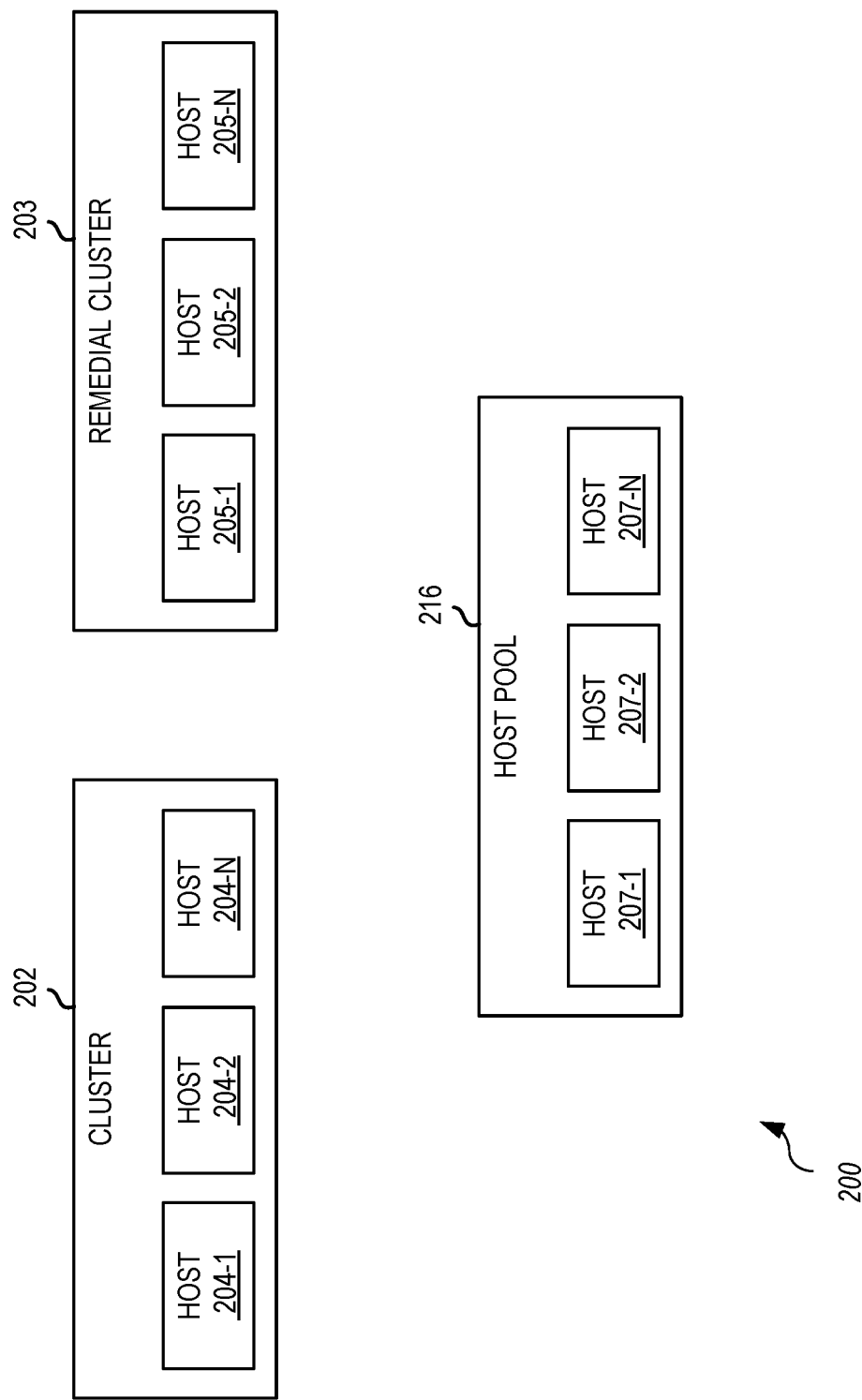
FIG. 2A is a block diagram illustrating a system for workload placement responsive to fault according to one or more embodiments of the present disclosure.

FIG. 2A is a block diagram illustrating a system for workload placement responsive to fault according to one or more embodiments of the present disclosure. As shown in FIG. 2A, the system 200 includes a cluster 202, a remedial cluster 203 and a host pool 216.

The cluster 202 can be a production cluster analogous to the cluster 102, previously described in connection with FIG. 1. It is noted that for the purposes of clarity, certain elements of the cluster 102 are not illustrated in the system 200 of FIG. 2. The cluster 202 includes a plurality of hosts 204-1, 204-2, . . . , 204-N (referred to generally herein as "hosts 204"). The cluster 202 is configured to run stateful workloads.

The remedial cluster 203 is configured (e.g., designated) to run stateless workloads. In some embodiments, each VCI of the remedial cluster 203 is stateless. The remedial cluster 203 includes a plurality of hosts that each have a respective fault in their respective hypervisors. For instance, the remedial cluster 203 includes faulty hosts 205-1, 205-2, . . . , 205-N (referred to generally herein as "faulty hosts 205"). While these hosts are described herein as "faulty," it is noted that a part (e.g., most) of an SSD of each of the hosts 205 is functional and viable. Stated differently, in some embodiments, each of the hosts 205 includes a portion of an SSD that has undergone excessive writes and a portion that is unaffected by excessive writes. It is noted that while the example of excessive writes causing data degradation is described herein for purposes of example, embodiments of the present disclosure are not so limited. Any factor or fault causing the incomplete reduction in performance of an SSD is in accordance with the present disclosure. Additionally, in some embodiments, the remedial cluster 203 can include one or more hosts that are not faulty. For instance, some embodiments include seeding the remedial cluster 203 with at least one fully functional host before any faulty hosts are placed into the remedial cluster 203.

The host pool 216 includes a plurality of functioning hosts 207-1, 207-2, . . . , 207-N (referred to generally herein as "replacement hosts 207"). The replacement hosts 207 can be physically remote with respect to the cluster 202. In some embodiments, the replacement hosts 207 are part of a cluster. In some embodiments, the replacement hosts 207 are not part of a cluster. The replacement hosts 207 may be located in a same datacenter or in a different datacenter than the hosts 204 of the cluster 202. Each of the replacement hosts 207 can be kept in an activated state (e.g., powered on) and can have an accessible internet protocol (IP) address and root credentials. Stated differently, the replacement hosts 207 are configured to be added to the cluster 202 immediately, if desired.

In an example, one of the hosts (host 204-1) of the cluster 202 is determined to be faulty. In some embodiments, for instance, a fault in an SSD of a hypervisor of the host 204-1 can be determined. Determining a fault, as referred to herein, can include monitoring an SSD with a monitoring agent. The monitoring agent can count read errors associated with the SSD. When a threshold-exceeding quantity or rate of read errors on a particular host is counted, the monitoring agent can trigger an event in an event log. Embodiments herein can receive the event and instruct the affected host 204-1 to enter a maintenance mode. As will be appreciated to those of skill in the art, placing a host in maintenance mode evacuates all workloads running on the host.

In some embodiments, the affected host 204-1, once placed in maintenance mode, is removed from the cluster 202 and placed into the remedial cluster 203. The cluster 202, having been deprived of a host, is temporarily operating under a reduced capacity that might impact its ability to service its current workloads. Accordingly, a replacement host (207-2 in this example) is selected from the pool 216 for addition to the cluster 202.

Figure 2B:
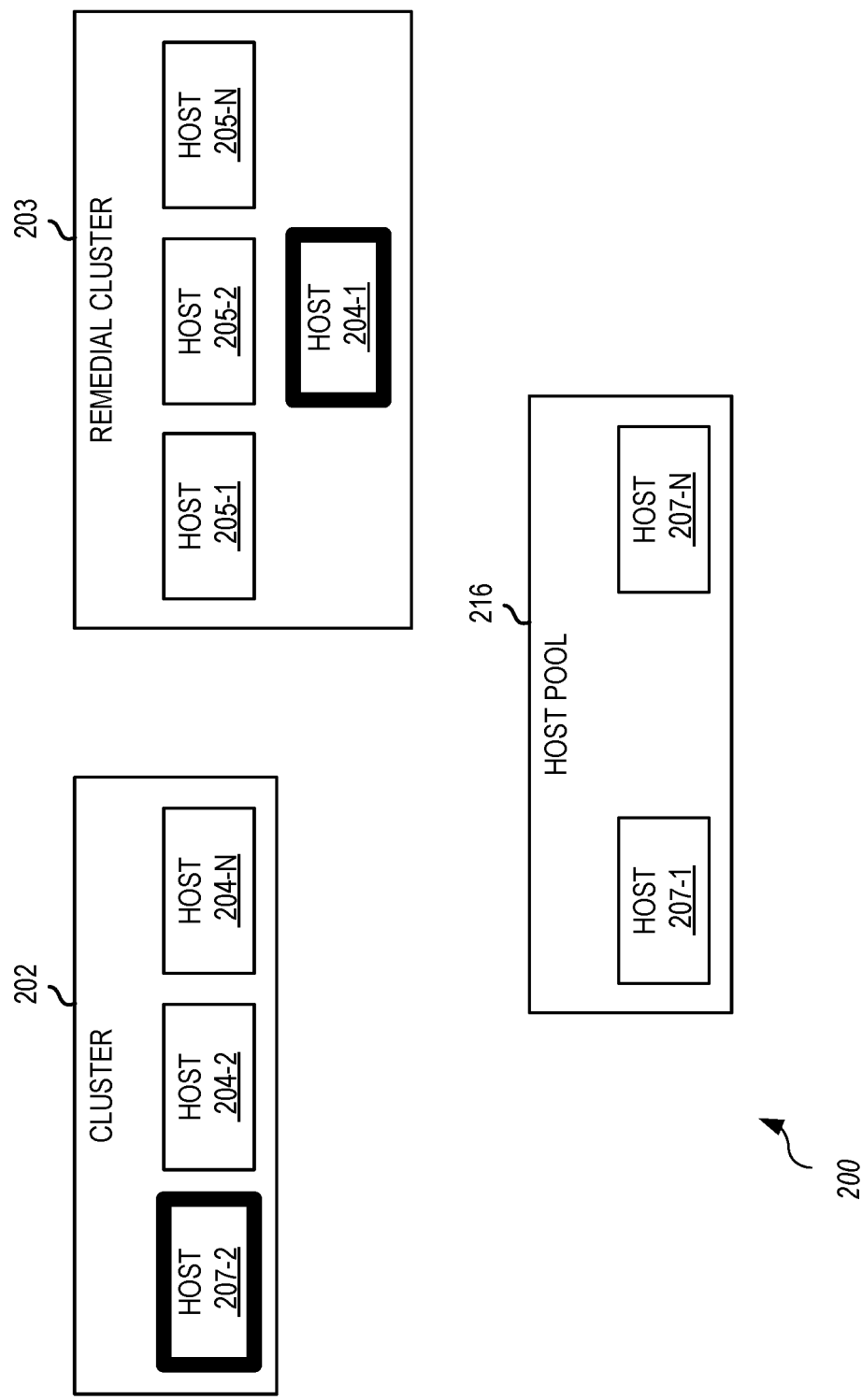
FIG. 2B is a block diagram illustrating a system for workload placement responsive to fault after the placement has occurred according to one or more embodiments of the present disclosure.

FIG. 2B is a block diagram illustrating a system for workload placement responsive to fault after the placement has occurred according to one or more embodiments of the present disclosure. As shown in FIG. 2B, the affected host 204-1 is now part of the remedial cluster 203, having been moved from the cluster 202, and the cluster 202 instead includes the replacement host 207-2 selected from the pool 216. Stateless workloads can be run on the remedial cluster 203. Stateful workloads can be run on the cluster 202. Though not illustrated in FIG. 2B, it is noted that the affected host 204-1 can be deployed as a part of a mirrored pair with an additional affected host in the remedial cluster 230 to provide availability through potential failover.

In some instances, more than one remedial cluster 203 may be available. Stated differently, each of a plurality of remedial clusters can include a plurality of hosts, and each of these plurality of hosts can have a respective fault in its respective hypervisor. Embodiments of the present disclosure can select a suitable remedial cluster from among this plurality of remedial clusters. Some embodiments include selecting the remedial cluster 230 from the plurality of clusters based on a respective quantity of hosts in each of the plurality of clusters. The selected remedial cluster 230 may have the fewest quantity of hosts, for instance. In some embodiments, latency may additionally be used to select the remedial cluster 230. For example, a latency between the cluster 202 and each of the plurality of remedial clusters can be determined. This latency may be an average latency of all the hosts within a cluster. The selected remedial cluster 230 may exhibit the lowest latency of the plurality of remedial clusters.

Figure 3:
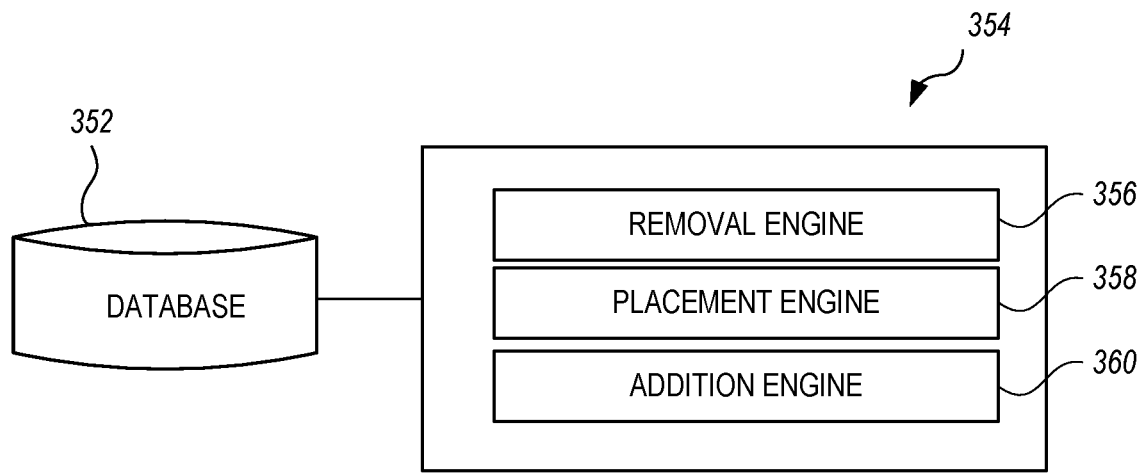
FIG. 3 is a diagram of a system for workload placement responsive to fault according to one or more embodiments of the present disclosure.

FIG. 3 is a diagram of a system 314 for workload placement responsive to fault according to one or more embodiments of the present disclosure. The system 314 can include a database 352, a subsystem 354, and/or a number of engines, for example, removal engine 356, placement engine 358, and/or addition engine 360, and can be in communication with the database 352 via a communication link. The system 314 can include additional or fewer engines than illustrated to perform the various functions described herein. The system can represent program instructions and/or hardware of a machine (e.g., machine 466 as referenced in FIG. 4, etc.). As used herein, an "engine" can include program instructions and/or hardware, but at least includes hardware. Hardware is a physical component of a machine that enables it to perform a function. Examples of hardware can include a processing resource, a memory resource, a logic gate, an application specific integrated circuit, a field programmable gate array, etc.

The number of engines can include a combination of hardware and program instructions that is configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the removal engine 356 can include a combination of hardware and program instructions that is configured to remove a first host from a first cluster of an SDDC responsive to a determination of a fault in a hypervisor of the first host. In some embodiments, the placement engine 358 can include a combination of hardware and program instructions that is configured to place the first host into a second cluster of the SDDC, wherein the second cluster is designated to run stateless workloads. In some embodiments, the addition engine 360 can include a combination of hardware and program instructions that is configured to add a second host to the first cluster. The addition engine 360 can be configured to select the second host from a pool of functioning hosts, and wherein each host of the pool is kept in an activated state and includes an accessible IP address and root credentials.

Figure 4:
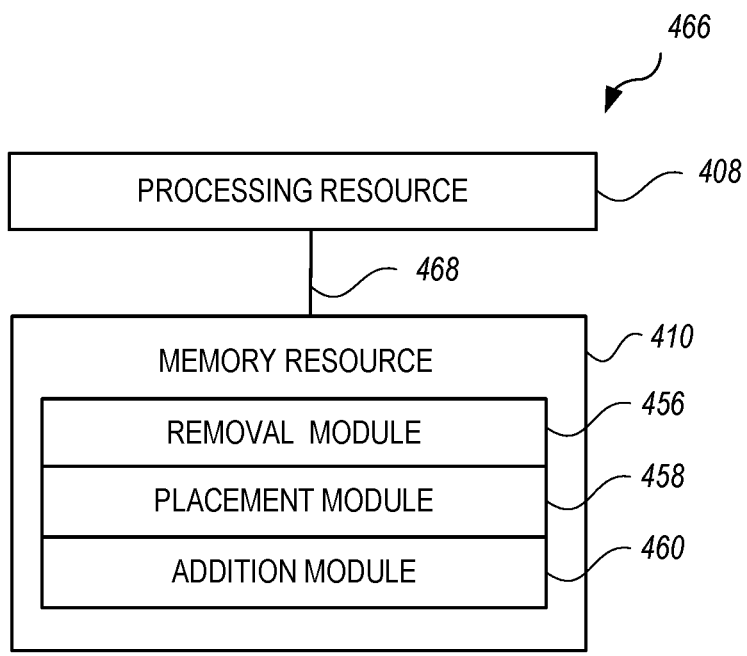
FIG. 4 is a diagram of a machine for workload placement responsive to fault according to one or more embodiments of the present disclosure.

FIG. 4 is a diagram of a machine for workload placement responsive to fault according to one or more embodiments of the present disclosure. The machine 466 can utilize software, hardware, firmware, and/or logic to perform a number of functions. The machine 466 can be a combination of hardware and program instructions configured to perform a number of functions (e.g., actions). The hardware, for example, can include a number of processing resources 408 and a number of memory resources 410, such as a machine-readable medium (MRM) or other memory resources 410. The memory resources 410 can be internal and/or external to the machine 466 (e.g., the machine 466 can include internal memory resources and have access to external memory resources). In some embodiments, the machine 466 can be a VCI. The program instructions (e.g., machine-readable instructions (MRI)) can include instructions stored on the MRM to implement a particular function (e.g., an action such as removing a host from a cluster, as described herein). The set of MRI can be executable by one or more of the processing resources 408. The memory resources 410 can be coupled to the machine 466 in a wired and/or wireless manner. For example, the memory resources 410 can be an internal memory, a portable memory, a portable disk, and/or a memory associated with another resource, e.g., enabling MRI to be transferred and/or executed across a network such as the Internet. As used herein, a "module" can include program instructions and/or hardware, but at least includes program instructions.

Memory resources 410 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change memory (PCM), 3D cross-point, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, magnetic memory, optical memory, and/or a solid state drive (SSD), etc., as well as other types of machine-readable media.

The processing resources 408 can be coupled to the memory resources 410 via a communication path 468. The communication path 468 can be local or remote to the machine 466. Examples of a local communication path 468 can include an electronic bus internal to a machine, where the memory resources 410 are in communication with the processing resources 408 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 468 can be such that the memory resources 410 are remote from the processing resources 408, such as in a network connection between the memory resources 410 and the processing resources 408. That is, the communication path 468 can be a network connection. Examples of such a network connection can include a local area network (LAN), wide area network (WAN), personal area network (PAN), and the Internet, among others.

As shown in FIG. 4, the MRI stored in the memory resources 410 can be segmented into a number of modules 456, 458, 460 that when executed by the processing resources 408 can perform a number of functions. As used herein a module includes a set of instructions included to perform a particular task or action. The number of modules 456, 458, 460 can be sub-modules of other modules. For example, the placement module 458 can be a sub-module of the removal module 456 and/or can be contained within a single module. Furthermore, the number of modules 456, 458, 460 can comprise individual modules separate and distinct from one another. Examples are not limited to the specific modules 456, 458, 460 illustrated in FIG. 4.

Each of the number of modules 456, 458, 460 can include program instructions and/or a combination of hardware and program instructions that, when executed by a processing resource 408, can function as a corresponding engine as described with respect to FIG. 3. For example, the addition module 460 can include program instructions and/or a combination of hardware and program instructions that, when executed by a processing resource 408, can function as the addition engine 360, though embodiments of the present disclosure are not so limited.

The machine 466 can include a removal module 456, which can include instructions to remove a first host from a first cluster of an SDDC responsive to a determination of a fault in a hypervisor of the first host. The machine 466 can include a placement module 458, which can include instructions to place the first host into a second cluster of the SDDC, wherein the second cluster is designated to run stateless workloads. The machine 466 can include an addition module 460, which can include instructions to add a second host to the first cluster.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A non-transitory machine-readable medium having instructions stored thereon which, when executed by a processor, cause the processor to:
    remove a first host from a first cluster of a software-defined datacenter (SDDC) responsive to a determination of a fault in a hypervisor of the first host;
    place the first host into a second cluster of the SDDC, wherein the second cluster is designated to run stateless workloads; and
    add a second host to the first cluster.

2. The medium of claim 1, wherein the fault is caused by excessive writes to a first portion of a solid-state drive (SSD) of the hypervisor.

3. The medium of claim 2, wherein the SSD includes a second portion unaffected by excessive writes.

4. The medium of claim 1, including instructions to select the second host from a pool of functioning hosts.

5. The medium of claim 1, wherein the second cluster includes a plurality of hosts, each having a respective fault in its respective hypervisor.

6. The medium of claim 1, including instructions to select the second cluster from a plurality of clusters, wherein each of the plurality of clusters includes a plurality of hosts, and wherein each of the plurality of hosts has a respective fault in its respective hypervisor.

7. The medium of claim 6, including instructions to select the second cluster from the plurality of clusters based on a respective quantity of hosts in each of the plurality of clusters.

8. The medium of claim 1, including instructions to deploy the first host as a part of a mirrored pair in the second cluster.

9. A method, comprising:
    determining a reduction in performance of a solid-state drive (SSD) of a hypervisor of a host of a cluster of a software-defined datacenter (SDDC);
    removing the host from the cluster;
    placing the host into a remedial cluster of the SDDC, wherein the remedial cluster is designated to run stateless workloads;
    selecting a replacement host from among a plurality of replacement hosts in the SDDC;
    adding the selected replacement host to the cluster;
    running a stateless workload on the remedial cluster using the host; and
    running a stateful workload on the cluster using the replacement host.

10. The method of claim 9, wherein determining the reduction in performance of the SSD includes determining data degradation associated with at least one block of the SSD.

11. The method of claim 9, wherein determining the reduction in performance of the SSD includes triggering an event in an event log, by a monitoring agent, responsive to determining a threshold-exceeding quantity of read errors associated with the SSD.

12. The method of claim 11, wherein the method includes instructing the host to enter a maintenance mode before removing the host from the cluster.

13. The method of claim 12, wherein the method includes instructing the host to leave the maintenance mode after placing the host into the remedial cluster.

14. The method of claim 9, wherein the method includes selecting the remedial cluster from among a plurality of remedial clusters responsive to determining that the remedial cluster includes a lesser quantity of hosts than others of the plurality of remedial clusters.

15. The method of claim 9, wherein the method includes selecting the remedial cluster from among a plurality of remedial clusters based on:
    a respective quantity of hosts in each of the plurality of remedial clusters; and
    a respective latency between the cluster and each of the plurality of remedial clusters.

16. The method of claim 9, wherein the method includes seeding the remedial cluster with at least one fully functional host before placing the host into the remedial cluster.

17. A system, comprising:
    a removal engine configured to remove a first host from a first cluster of a software-defined datacenter (SDDC) responsive to a determination of a fault in a hypervisor of the first host;
    a placement engine configured to place the first host into a second cluster of the SDDC, wherein the second cluster is designated to run stateless workloads; and
    an addition engine configured to add a second host to the first cluster.

18. The system of claim 17, wherein the second host is physically remote from the first cluster.

19. The system of claim 18, wherein the addition engine is configured to select the second host from a pool of functioning hosts, and wherein each host of the pool is kept in an activated state and includes an accessible internet protocol (IP) address and root credentials.

20. The system of claim 18, wherein each virtual computing instance (VCI) of the second cluster is stateless.

* * * * *